US009944866B2

(12) United States Patent
Streitenberger et al.

(10) Patent No.: US 9,944,866 B2
(45) Date of Patent: Apr. 17, 2018

(54) THREE-ZONE GASIFIER AND METHOD FOR OPERATING SUCH A GASIFIER IN ORDER TO THERMALLY CONVERT BYPRODUCTS AND WASTE MATERIALS

(71) Applicant: RECOM PATENT & LICENSE GMBH, Berlin (DE)

(72) Inventors: Hartwig Streitenberger, Golmsdorf (DE); André Kabis, Ottendorf (DE); Reinhard Stöber, Frönitz (DE); Johannes Zepter, Jena (DE); Robert Wilfer, Köstritz (DE)

(*) Notice: Subject to any disclaimer, the term of this patent is extended or adjusted under 35 U.S.C. 154(b) by 116 days.

(21) Appl. No.: 15/023,359

(22) PCT Filed: Aug. 21, 2014

(86) PCT No.: PCT/DE2014/000438
§ 371 (c)(1),
(2) Date: Jul. 18, 2016

(87) PCT Pub. No.: WO2015/039640
PCT Pub. Date: Mar. 26, 2015

(65) Prior Publication Data
US 2016/0369192 A1    Dec. 22, 2016

(30) Foreign Application Priority Data

Sep. 20, 2013 (DE) .................. 10 2013 015 920

(51) Int. Cl.
| C10J 3/72 | (2006.01) |
| C01B 3/02 | (2006.01) |
| C10J 3/30 | (2006.01) |
| C10J 3/26 | (2006.01) |
| C10J 3/60 | (2006.01) |

(52) U.S. Cl.
CPC .............. *C10J 3/721* (2013.01); *C01B 3/02* (2013.01); *C10J 3/26* (2013.01); *C10J 3/30* (2013.01); *C10J 3/60* (2013.01); *C10J 2200/152* (2013.01); *C10J 2200/158* (2013.01); *C10J 2300/0946* (2013.01); *C10J 2300/1838* (2013.01); *C10J 2300/1846* (2013.01)

(58) Field of Classification Search
CPC .............. C10J 3/721; C10J 3/30; C01B 3/02
USPC .................................................. 423/648.1
See application file for complete search history.

(56) References Cited

FOREIGN PATENT DOCUMENTS

| DE | 4417082 C1 | 10/1995 |
| DE | 19937521 A1 | 2/2001 |
| DE | 102008058602 A1 | 6/2010 |
| EP | 0609802 A1 | 8/1994 |
| NL | 8200417 A | 9/1983 |
| WO | 200151591 A1 | 7/2001 |
| WO | 2008059109 A1 | 5/2008 |
| WO | 2011101022 A1 | 8/2011 |

OTHER PUBLICATIONS

International Search Report dated Nov. 28, 2014, in International Application No. PCT/DE2014/000438, 2 pages.
Office Action dated Aug. 3, 2015, issued in German Patent Application No. 10 2013 015 920.2, 9 pages.
EP3046997-PCT-EP Grant of Patent Intended, Jul. 13, 2017, 35 pages.

*Primary Examiner* — Douglas B Call
(74) *Attorney, Agent, or Firm* — Rothwell, Figg, Ernst & Manbeck, P.C.

(57) ABSTRACT

The invention relates to a device in the form of a 3-zone gasifier and to a method for operating such a gasifier.

10 Claims, 3 Drawing Sheets

THREE-ZONE GASIFIER AND METHOD FOR OPERATING SUCH A GASIFIER IN ORDER TO THERMALLY CONVERT BYPRODUCTS AND WASTE MATERIALS

The invention relates to a device in the form of a 3-zone gasifier according to the preamble of the claims and to a method for operating such a gasifier, e.g. in an assembly for thermal decomposition of waste products and waste (carbonaceous solids).

A number of devices and methods are already known which disclose the processing and/or combustion and/or gasification of carbonaceous waste products and waste materials.

For instance, EP 0 609 802 A1 discloses a device and a method for is continuous degasification and/or gasification. The device according to EP 0 609 802 A1 consists of a shaft-type reactor, wherein the charge, the gaseous gasifying agent and the produced gaseous fuel are passed downwards in a cocurrent flow. In doing so, the gasifying agent is preheated by the gaseous fuel in a helical countercurrent heat exchanger located in the jacket part. Said preheated gasifying agent is further heated in helical or corrugated channels in the ceramic hearth body of the reactor and in a movable or fixed, conical or paraboloid central body which serves as a hearth closure and protrudes into the lower part of the charge. The grate is formed by a solid cone or by a rotatable, vertically displaceable counterpiece which represents a hollow-conical annular body and which leaves open an adjustable annular passage opposite the lower hearth part for extraction of the generated gaseous fuel and for discharging the solid or liquid reaction products in the form of ash, slag and distillation residues.

This technical solution has the disadvantage that the degasification and/or gasification of the solid fuels or waste materials is incomplete. Furthermore, the descending cocurrent degasifier is also sensitive in terms of the fragmented size of the fuel. Moreover, this gasifier has a rather poor partial load behaviour, because the amount of gasifying agent decreases at partial load, the hot zones become smaller and the intermediate, low-temperature zones increase. This increases the tar content in the product gas. However, a low-tar product is produced only if the temperature in the firebed is sufficiently high (temperature stability) across the entire cross-section of the gasifier and the pyrolisis gases flow through a closed, hot reduction zone. In plants of large dimensions, this is not the case and is relatively difficult to achieve. Apart from the restricted dwell times, resulting in reduced performance, this type of gasifier is also prone to process-induced clogging and displacements.

DE 199 37 521 A1 discloses a method and a device, especially for treating waste products that have already partially decomposed. The device consists of a shaft-type reactor with a funnel-shaped bottom, in which the carbon particulate charge is introduced in a tangential orientation and the air is introduced as a gasifying agent in an axial orientation and converted to syngas by a thermochemical reaction as it is ascends.

The frustoconical bottom part further comprises a lateral annular gap through which the air can enter the reactor chamber axially and mix with the carbon gas mixture. This gas mixture sweeps the carbon particles from the solid bed with it in an outwardly ascending manner and is converted energetically to syngas at up to 1,200° C. in the reactor chamber.

In the upper part of the container, the flow drops towards the interior and calms down, so that the carbon particles not yet thermally decomposed and the ash components drop down again. Then they enter a centrally arranged collecting funnel which extends all the way to the bottom part and is cleared via a screw conveyor.

This technical solution has the disadvantage that the degasification and/or gasification of the solid materials is incomplete and that process stability changes disadvantageously due to uncontrolled feeding of carbon, accompanied by deposition and slagging, in particular of inert components, on the frustoconical bottom part, which may result in clogging and consequently cause uncontrollable process standstill. Moreover, a substantial part of the carbon components not thermally converted is discharged along with the ash and slag.

Another disadvantage is the resulting high percentage of dust (carbon) and tar in the product gas.

DE 44 17 082 C1 discloses a reactor for thermal gasification of solid fuel, said reactor comprising a fuel supply in the reactor bottom, a vertical fuel conveyor for feeding the fuel into a gasification space chargeable with the fuel, a supply line for supplying preheated primary air into the gasification space, said supply line terminating in nozzles, an ash discharge and a post-combustion space arranged above the gasification space, which post-combustion space can be supplied with secondary air and into which the gases resulting from the fuel enter, said gasification space being provided with a stirrer effective essentially over the entire height of the gasification space, an ash discharge opening being arranged at the top of the gasification space and the post-combustion space having at least one wall arranged therein substantially over the entire interior cross-section of the reactor, said wall reflecting heat radiation and comprising at least one gas passage opening.

The wall reflecting heat radiation and comprising at least one gas passage opening is provided as a first wall of the post-combustion chamber, comprising a central gas passage opening and opened in a dome-like manner.

Above this first wall of the post-combustion chamber, opened in a dome-like manner, there is a second wall opened in a dome-like manner, which forms an annular gap together with the wall of the reactor, so that the post-combusted gas is diverted, causing solid particles swept along to drop out of the gas flow, so that a mostly dedusted raw gas is available at the raw gas outlet nozzle. Thus, this technical solution serves to improve the thermal gasification process.

DE 10 2008 058 602 A1 discloses a gasifier comprising a gasification chamber including a free gasifier space and a gasifier base, said free gasifier space being surrounded by a gasifier shell and having a syngas outlet at its one, closed end, and being connected at its second, open end with the gasifier base via the gasifier shell, said gasifier base being provided as a gasifier vessel on the inside into which an inlet device and at least one supply extend, said gasifier vessel and said gasifier shell together enclosing an isolation space, through which the inlet device, the supply, the central shaft and the agitator shaft with conveyor means extend, with the gasifier base shell holding them, and a gasifyier dome being arranged in the gasifier space in such a manner as to generate a gap between the gasifier dome and the gasifier shell and/or the gasifier vessel, said gasifier vessel comprising a bottom with recesses, said bottom being arranged opposite the gasifier space and terminating in a central shaft, said central shaft passing into a discharge shaft and stirring tools being rotatably supported by a horizontal agitator shaft in the gasifier vessel, said agitator shaft being surrounded by a conveyor means.

The gasifier dome has a hood-shaped design and is centrally arranged in the free gasifier space. The gap may be provided as an annular gap. The gasifier vessel of the moving-bed gasifier according to DE 10 2008 058 602 A1 is charged with waste products or waste materials via the inlet device, said waste products and waste materials being stirred by the stirrers and gasified with gasifying agent through the is recesses in the bottom, gasification of the waste products or waste materials taking place in the gasifier base and the gasifier space, the gasification products passing through the annular gap and being evacuated via the syngas outlet, wherein the ash and slag formed during gasification are evacuated by means of the discharge device through the recesses in the bottom, via the central shaft and the discharge shaft.

Both technical solutions according to DE 44 17 082 C1 and DE 10 2008 058 602 A1 have the disadvantage that a vertical or horizontal agitator shaft with conveyor means is provided for stirring the waste products or waste materials, which may lead to malfunctions in the operation of the gasifiers, e.g. when solids in the waste products or waste materials mechanically block the conveyor means or when clogging of the gasifiers occurs, for instance, due to non-dischargeable, agglomerated inert solids.

Moreover, these two technical solutions also have the disadvantage that the gasification process is subject to considerable variations as a result of process-induced, changing thermochemical reactions, and may thus be unstable, and the insufficient dwell time of the waste products or waste materials in the gasifier may adversely affect the complete gasification of the carbon particles as well as the dissociation of tars and phenols, generating a raw gas which is contaminated with tar and dust.

Therefore, it is an object of the invention to avoid the above disadvantages of the prior art and to provide a device in the form of a 3-zone gasifier which initiates, in particular, a longer dwell time and thus a qualitatively and quantitatively higher carbon conversion as well as enhanced performance of the gasification process, prevents process-induced clogging, displacements and congestion of the gasifier by inert solids and/or slag-forming contaminants, organises an intensification of the convective heat transfer into the carbon particles by conversion of a quasi-laminar flow into a turbulent flow by flow-shaping devices and a fixation of adaptive gasification zones, ensures stabilisation of the gasification process by separate feeding of e.g. carbonisation gases, gasifying agent, hot steam etc. into the gasification zones above the fluidised fixed bed as well as a differentiated and higher process and temperature stability by a controlling influence by means of flow guides within the gasification zones without accumulation of gas and heat and produces a nearly tar- and dust-free raw gas.

The above object is achieved by a gasifier as claimed in claim 1 and a method as claimed in claim 9. Advantageous embodiments are claimed in the dependent claims.

According to the subject matter of invention, the 3-zone gasifier of the invention and the method of the invention for continuous operation of the gasifier, e.g. in an arrangement for thermal conversion with gas treatment of carbonaceous waste products and/or waste materials (also referred to as carbonaceous solids), enable thermochemical conversion of said waste products and waste materials to a useful, high-quality and high-energy process gas, said carbonaceous waste products and waste materials (in particular incompletely decomposed carbons from final processes and gasification processes) being reacted even further and, if possible, completely, so as to allow their use in a process as free from pollutants, tar and dust as possible in accordance with the corresponding environmental standards.

The gasifier according to the invention (also referred to as 3-zone gasifier) comprises a gasifier trough with end walls, e.g. in the shape of a tub, trough, pot or depression, and a perforated bottom, which is advantageously channel-shaped and has a free aperture area of approx. 8-12% with respect to the area bordering the discharge chute.

The gasifier trough is surrounded by a casing, comprises a material outlet and is surrounded by a separating space which terminates in a discharge chute.

Moreover, the 3-zone gasifier comprises a gasifier shell with insulation, arranged above the gasifier trough, said gasifier shell preferably having a tubular shape and preferably being fixed by means of bearings.

The gasifier shell carries the gasifier head, said gasifier head also being provided with an insulation and, advantageously, with a servicing access as well as an evacuation duct.

The gasifier trough, the gasifier shell and the gasifier head are connected to each other in a gas-tight manner.

The gasifier shell and the gasifier head enclose a free gasifier space, with a syngas outlet being arranged in the upper part of the gasifier shell.

The 3-zone gasifier is provided with a contaminant outlet, comprises an all-encompassing casing as well as a solids inlet leading into the gasifier trough and preferably terminating therein horizontally as well as approximately two thirds below the filling limit of the solid material.

The gasifier is provided with a flexible connection which, according to the arrangement and requirement, enables integration of the gasifier in a thermal process line (e.g. in a large facility or in separate operation).

The discharge chute arranged below the perforated bottom is provided with a lock and terminates in an outlet device for residual matter.

At the same time, a gasifying agent supply terminates in the discharge chute, and an injector for separate admission of carbonisation gases, gasifying agent, hot steam, etc., is provided above the filling limit in the gasifier trough.

In the region above the flange connection between the gasifier trough and the separating space, a sheathed, truncated cone open on both sides is provided centrally in the free gasifier space, said truncated cone tapering towards the gasifier head and protruding over the gasifier trough in a bell-shaped/hood-shaped manner.

Said sheathed, truncated cone comprises a central annular gap opening at its open side facing towards the gasifier vessel, said gap being generated by a flow control valve.

Said flow control valve is formed by the flow ring (i.e. the upper edge of the truncated cone, facing towards the gasifier vessel), which constitutes a valve seat, and a preferably spherical flow control valve body arranged centrally, directly above the flow ring.

The flow control valve body has a centric guide and a locking means with a lifting device, which is arranged outside the gasifier head and is passes through the gasifier head. The guide with the lifting device enables movement of the flow control valve body with respect to the flow ring and thus regulates the dimension of the central annular gap opening of the flow control valve.

As an alternative, it is also possible, of course, to allow movement of the flow ring with respect to the flow control valve body, by designing the truncated cone so as to be movable, e.g. in that it is moved vertically in a controlled manner by a lifting device, which is arranged outside the gasifier head, and by means of a lifting linkage passing through the gasifier head.

The essential aspect of both technical solutions is that a central annular gap opening is generated between the upper part of the sheathed, truncated cone and the flow control valve, said annular gap opening being changed/adjusted in dimension by means of the lifting device via the centric guide (first flow channel), and that the casing of the truncated cone forms a radial annular gap opening together with a baffle extending around the inner circumference of the gasifier shell (second flow channel). Depending on the particular design, either the first or the second or the first and the second flow channels can be regulated.

These two adjustable flow channels, the organised filling limit of an admitted solid, which leads to a fluidised fixed bed, and the special gasifier design/geometry result in three zones being formed in the gasifier:

an adaptive gasification zone Z1 in the fluidised fixed bed,
an adaptive gasification zone Z2 above the fluidised fixed bed as well as in the interior of the sheathed, truncated cone, and
an adaptive gasification zone Z3 in the interior of the gasifier trough and in the free gasifier space.

Of course, all connections, inlets and outlets of the gasifier are favourably provided in a gas and pressure-tight manner and the gasifier is thermally insulated.

In the method for operating the above-described 3-zone gasifier, the latter is preferably integrated in an arrangement, known per se, for the thermal conversion of waste products and/or waste materials as a gasifier for the conversion including gas treatment (the 3-zone gasifier may also be operated separately, however), wherein the gasifier trough is charged with the carbonaceous solids or with a solids/gas mixture via the solids inlet and is loaded, via the channel-shaped perforated bottom arranged in the lower part of the gasifier trough, with a pre-heated gasifying agent admitted in a controlled manner, rising up from the bottom to the top, resulting in fluidised floating of the fixed bed in the adaptive gasification zone Z1 in the operating condition required in terms of temperature, preferably at approximately 800° C., accompanied by a reactive thermochemical conversion of the carbonaceous solids to a syngas with a high calorific value.

The solid matter released, but not yet converted, during said floating is subject to another thermochemical conversion at approximately 1300° C. in the subsequent adaptive gasification zone Z2, above the filling limit, caused by intensive convective heat transfer and a reduced flow velocity of the gas mixture by means of the sheathed, truncated cone arranged above the fluidised fixed bed.

This process is enhanced by separate introduction of carbonisation gases, gasifying agent, hot steam etc. via the injector into gasification zone Z2 and the complex gas passage over the radial annular gap opening, the controlled central annular gap opening in the upper part of the sheathed, truncated cone and parallel flow channel insofar as the quasi-laminar flow process changes into a turbulent flow process, resulting in performance-increasing turbulences.

The resulting speed distribution across the adaptive gasification zones, in particular at the turbulent passage of the central annular gap and the flow channel into the available free gasifier space of the adaptive gasification zone Z3, preferably at approximately 950° C., has a prolonging effect on the dwell time of the still present, floating residual carbon and its nearly complete conversion to syngas.

The specific way in which the gas is guided using the process-stabilising gasification and temperature zones Z1 to Z3 and an available free gasifier space causes the organic compounds, in particular also tar, to be is destroyed almost completely and converted into syngas with a high calorific value.

At the same time, the inert contaminants (ash, slag, stones, mineralic residuals etc.), having a higher density than the fluidised carbon mixture, descend and are discharged via the channel-shaped perforated bottom, the discharge chute, the lock and the outlet device. Any inseparable residuals above the channel-shaped perforated bottom are removed via the contaminant outlet, preferably a screw/helix.

The same device regulates the required filling level in the gasifier trough and thus the filling limit of the carbonaceous solids. The carbon components can be fed back for further use to the previous process and/or the gasifier after separation of the contaminants.

The resulting syngas, substantially consisting of CO, $H_2$, $CH_4$ and $CO_2$, is extracted in the upper part of the gasifier and supplied for further use after a purification and cooling process.

Advantages for continuous process operation result in particular from the spatial division into adaptive gasification zones Z1 to Z3, the stabilisation and improvement of the gasification process by carbonisation gases etc. and the possibility to alter flow relationships due to the sheathed, truncated cone with the flow control valve via two flow channels, as well as the controlling influence on the gasification process (temperature and pressure) under selective atmospheric and stoichiometric conditions.

The advantage of the above-described 3-zone gasifier and of the method for operating such a gasifier consists in a longer dwell time and a resulting qualitative and quantitative increase in carbon conversion as well as enhanced performance of the gasification process, while preventing process-induced clogging, displacements and congestion of the gasifier by inert solids and/or slag-forming contaminants.

Moreover, the 3-zone gasifier and the method for operating the gasifier result in a more intensive convective heat transfer into the carbon particles by conversion of a quasi-laminar flow into a turbulent flow through the flow-shaping devices and through the organisation of adaptive gasification zones.

Furthermore, a stabilisation of the gasification process is ensured by the separate admission, e.g. of carbonisation gases, gasifying agent, hot steam etc. into the gasification zones above the fluidised fixed bed, as well as a differentiated and higher process and temperature stability by controlling influence via flow guides using the two flow channels within the gasification zones Z1 to Z3 without accumulation of gas and heat, allowing an almost completely dedusted raw gas to be produced.

The invention will be explained in more detail below with reference to the schematic drawings, wherein.

Figure 1:
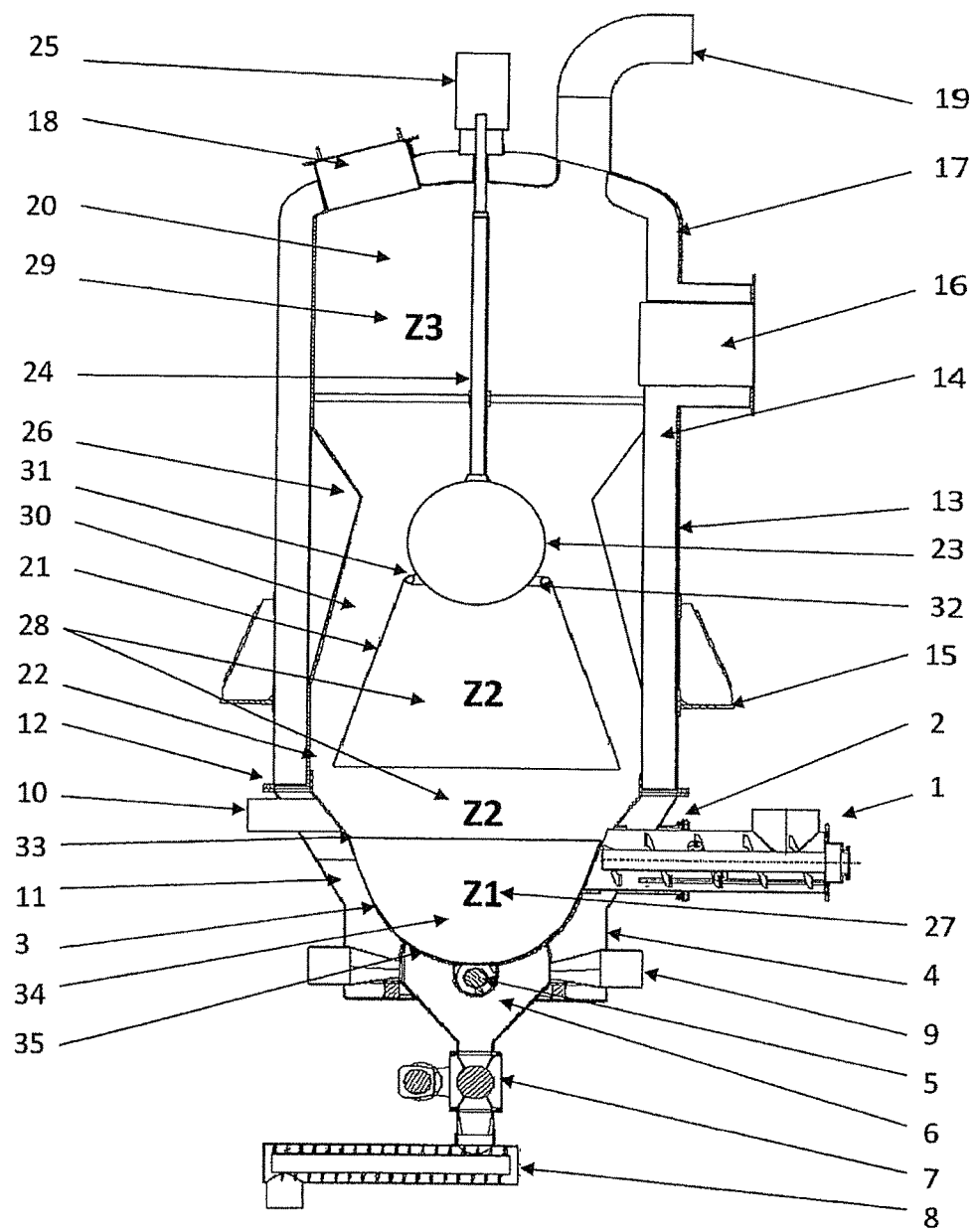
FIG. 1 shows a schematic sectional view of an embodiment of the 3-zone gasifier according to the invention.

The 3-zone gasifier shown in FIG. 1 comprises a lower gasifier trough (3) with a casing (4) and a preferably tubular gasifier shell (13) arranged above it, said gasifier shell (13)

comprising an insulation (14), a syngas outlet (16), a gasifier head (17) with a servicing access (18) and an evacuation duct (19), wherein the gasifier trough (3), the casing (4) and the discharge chute (6) are connected to the gasifier shell (13) in a gas-tight manner and the gasifier shell (13) is fixed via a bearing (15).

The gasifier trough (3) is preferably semi-tubular, comprising lateral end walls and comprises, tapering from top to bottom, a preferably channel-shaped, perforated bottom (35), a contaminant outlet (5) arranged therein along a longitudinal axis, a solids inlet (1), preferably horizontal and including a conveyor screw, and a flexible connection (2), preferably two thirds below the filling limit (33), and an injector (10) placed above the filling limit of the fluidised fixed bed (34).

Below the gasifier trough (3), which is preferably provided with a channel-shaped, perforated bottom (35), a discharge chute (6) is provided in the separating space (11) between the gasifier trough (3) and the casing (4), said discharge chute (6) being provided with a gasifying agent supply (9) which may have a single- or multi-piece design. The discharge chute (6) is connected to a lock (7), preferably a rotary airlock, and an outlet device (8), preferably a conveyor screw or a tube chain conveyor.

Arranged centrally above the flange connection (12) and within the gasifier shell (13) including the insulation (14), there is a sheathed, truncated cone (21), tapering from the bottom to the top and preferably with a closed surface, arranged so as to form a radial annular gap opening (22) between these parts and a central annular gap opening (32) at the upper part of the sheathed truncated cone (21) by the flow ring (31) and a flow control valve body (23) [referred to as a flow control valve for generating the annular gap opening (32)] arranged centrally above said flow ring (31).

A circumferential baffle (26) is arranged on the inside of the gasifier shell (13), nearly parallel to the sheathed, truncated cone (21), which is open on both sides, said baffle (26) preferably having an angular and/or segmented design, so that a flow channel (30) is formed between the truncated cone (21) and the baffle (26).

Arranged in the free gasifier space (20), below the gasifier head (17), is the centric guide with a locking mechanism (24) for the flow control valve body (23), said guide being connected to a lifting device (25) for vertical adjustment of the flow control valve body (23). The lifting device (25) is arranged outside the 3-zone gasifier and above the gasifier head (17).

Furthermore, the adaptive design of the 3-zone gasifier [adjustable dimension of the central annular gap opening (32)] and the selectively process-improving gasification zones and temperatures generate turbulent flows, in particular in the fluidised fixed bed (34) with the adaptive gasification zone Z1 (27), between the filling limit (33) and the sheathed, truncated cone (21) with the adaptive gasification zone Z2 (28), and in the free gasifier space (20) with the adaptive gasification zone Z3 (29).

Moreover, in an advantageous manner, the flow control valve body (23) can be optionally and selectively provided with a ball, cone or half-shell, planar or cylindrical shape, which influences, in particular, the flow and temperature conditions that are controlled by the adjustable dimension of the central annular gap opening (32).

Furthermore, the baffle (26) may optionally and selectively have an angular, round, oval, folded and/or profiled design.

For a process-based influence, the sheathed, truncated cone (21) may be perforated, provided with holes, slotted and/or sieve-shaped.

The half-shell gasifier trough (3) should have a free aperture surface of approx. 8 to 12% with respect to the area bordering the discharge chute (6).

Figure 2:
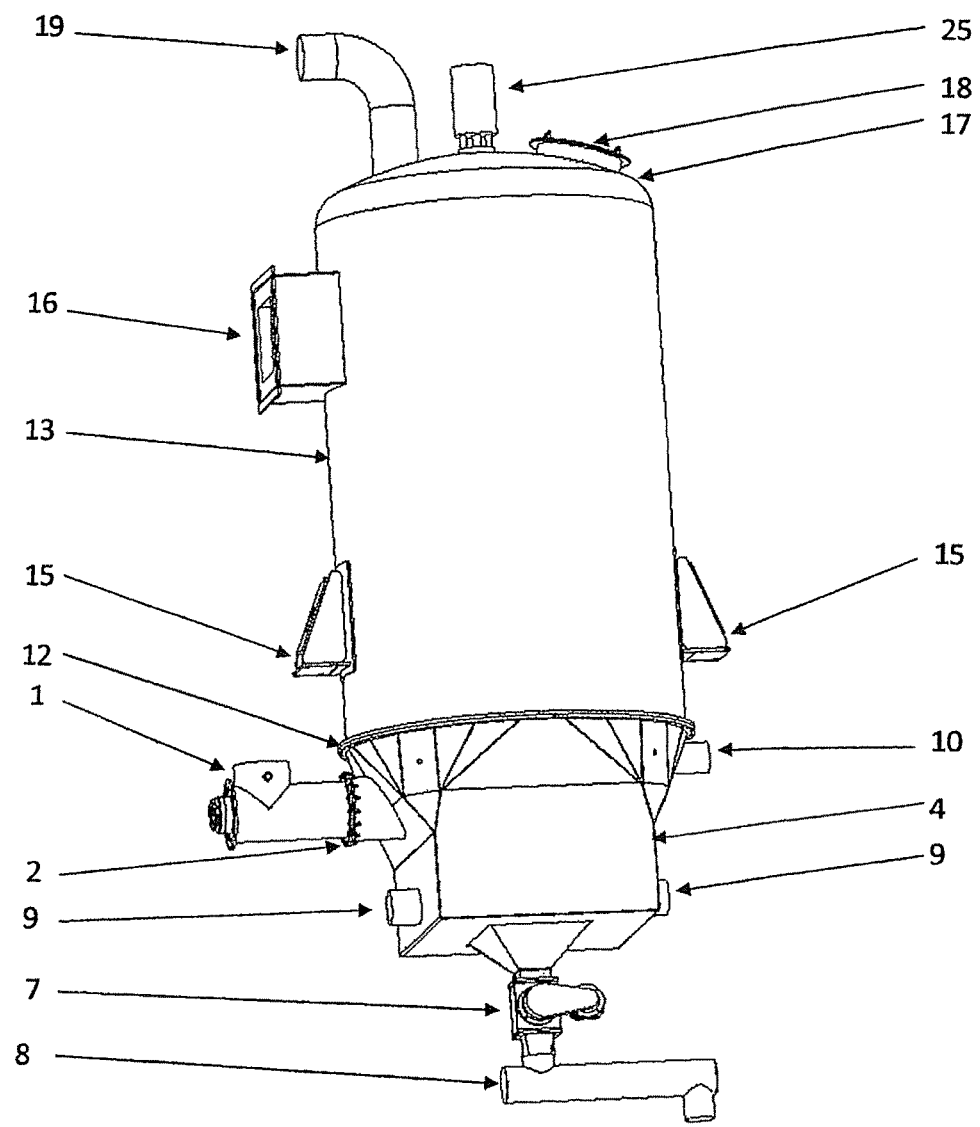
FIG. 2 shows a schematic representation of an external view of the 3-zone gasifier according to FIG. 1.

This 3-zone gasifier is operated as follows:

The 3-zone gasifier shown in FIGS. 1 and 2 enables the continuous conversion of carbonaceous solids via selective partial oxidation and reduction (autothermal process control) by means of the three adaptive gasification zones Z1 and Z2 (27 and 28) as well as Z3 (29) with post-reduction and post-oxidation under defined atmospheric conditions. During operation, the flow inside the 3-zone gasifier ascends cocurrently from the bottom (quasi-laminar flow process) to the top (adapted turbulent flow process).

The carbonaceous solids and/or the solids/gas mixtures are introduced laterally during operation of the 3-zone gasifier by means of a horizontally arranged solids inlet (1), preferably a conveyor screw, with a flexible connection (2) through the casing (4) into the gasifier trough (3). The solids inlet (1) is preferably placed approx. two thirds below the filling limit (33).

The gasifying agent is then admitted as follows via the gasifying agent supply (9), which is enclosed by the separating space (11) arranged between the casing (4) and the gasifier trough (3):

During operation, the carbonaceous solid and/or a solid/gas mixture is introduced into the gasifier trough (3) up to the filling limit (33) and is loaded from the bottom to the top with preheated gasifying agent through the gasifying agent supply (9) and the discharge chute (6) and via the channel-shaped, perforated bottom (35), which is arranged in the direction of the longitudinal axis.

The upward flow causes the fixed bed to become fluidised and initiates the redox reactions, preferably at approx. 800° C. The accompanying floating in the area of the filling limit (33) of the carbonaceous solid results in an increased discharge of fine carbon particles into the adaptive gasification zone Z2 (28).

Adding e.g. carbonisation gases from a previous process, other gasifying agents, hot steam etc. to the gasification zone Z2 (28) via the injector (10), the carbon released is subject to another thermochemical conversion (oxidation and reduction), preferably at approximately 1300° C., caused by intensive convective heat transfer and a reduced flow velocity of the solid/gas mixture by means of the sheathed, truncated cone (21) arranged above the fluidised fixed bed (34), above the flange connection (12).

By complex guidance of the gas in the area of the flange connection (12) via the radial annular gap opening (22), in the area of the controlled central, annular gap opening (32) in the upper part of the sheathed, truncated cone (21) and the almost parallel flow channel (30), which is limited by the interior wall of the gasifier shell (13) with the insulation (14) and the baffle (26), the process in the 3-zone gasifier is enhanced insofar as the quasi-laminar flow process is changed to a turbulent flow process, resulting in performance-enhancing turbulences in the sense of gas output and calorific value, and a post-reduction/post-oxidation of the solid/gas mixture to a highly useful syngas.

The speed distribution across the adaptive gasification zones Z1, Z2 and Z3, in particular at the turbulent passage between the central annular gap opening (32), the flow ring (31) with the flow control valve body (23) arranged above it as well as the flow channel (30) formed between the sheathed, truncated cone (21) and the baffle (26), has a prolonging effect, at approximately 950° C. in the free gasification space (20), on the dwell time of the still present, floating residual carbon and its nearly complete conversion to syngas.

The resulting syngas, substantially consisting of CO, $H_2$, $CH_4$ and $SO_2$, is extracted via the syngas outlet (16) in the upper part of the gasifier shell (13) for further treatment and/or use.

The control of the flow control valve body (23) is effected by means of the centric guide (24) with the locking device and the associated lifting device (25), with a vertical adjustment of the flow control valve body (23) taking place in order to adjust the dimension of the annular gap opening (32).

Due to the thermochemical conversion of the carbon in the fluidised fixed bed (34) and the resulting multi-phase flow in the latter, the higher-density objects sink and the lower-density objects float to the top. The sinking inert materials (metal, stones, sand, ceramics etc.) and/or agglomerated ash and slag are evacuated, on the one hand, via the channel-shaped, perforated bottom (35), the discharge chute (6), the lock (7), which is preferably provided as a rotary airlock, and the outlet device (8), with the larger contaminants being evacuated via the contaminant outlet (5).

To ensure process stability and continuous operation of the gasifier, the contaminant outlet (5) also regulates the required filling level in the gasifier trough (3) and thus the filling limit (33) of the admitted carbonaceous solids.

Figure 3:
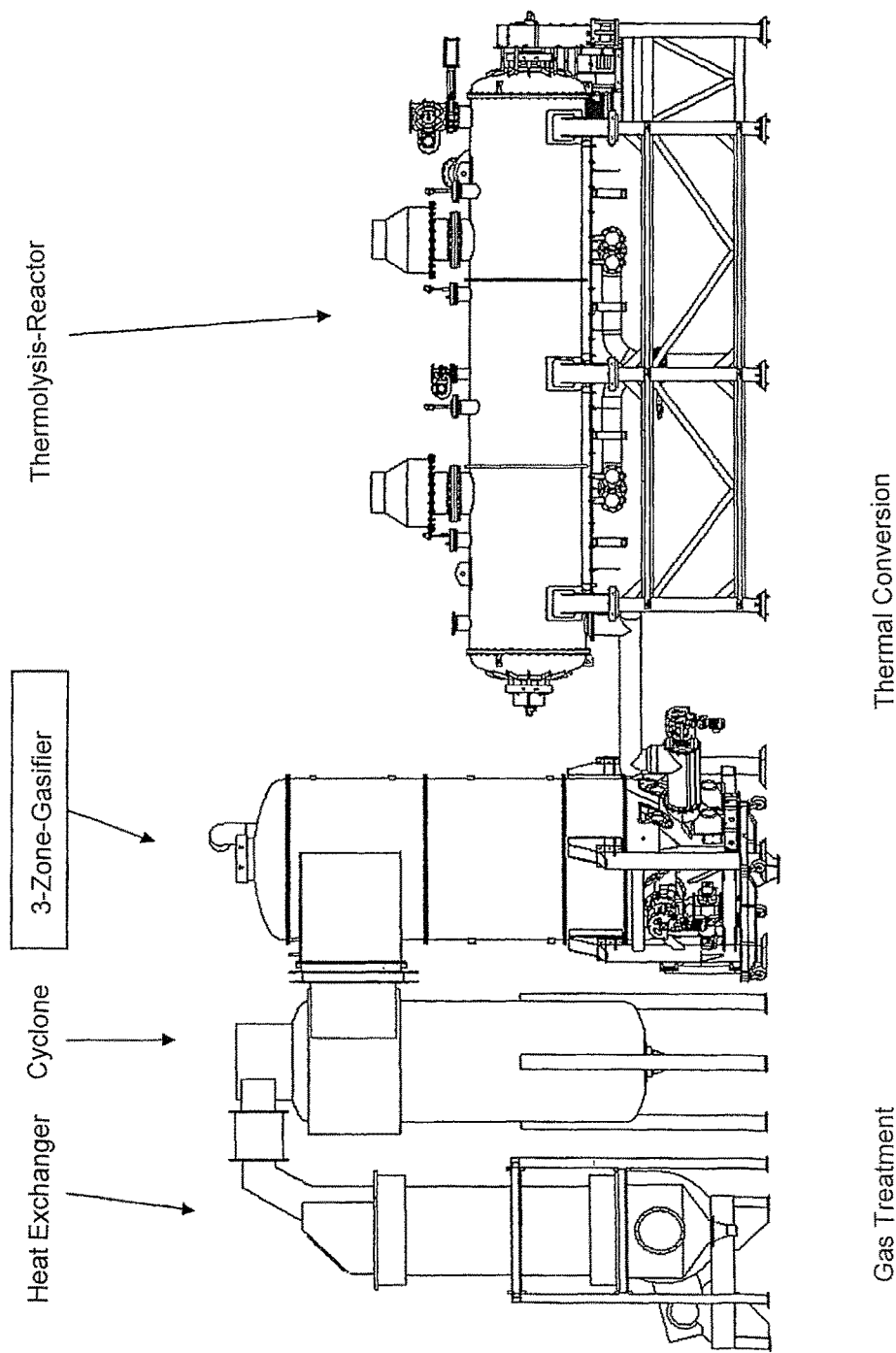
FIG. 3 shows a schematic overview of an arrangement for thermal conversion of carbonaceous waste products and/or waste materials including gas treatment using/integrating the 3-zone gasifier according to FIG. 1.

The 3-zone gasifier described herein can be used, as shown in FIG. 3, instead of a previously known gasifier in an existing or new arrangement for thermal conversion of waste products and/or waste materials and/or carbonaceous solids or as an individual unit for conversion and gas treatment.

Essential advantages of the 3-zone gasifier according to the invention are, in particular, that it initiates a longer dwell time and thus a qualitatively and quantitatively higher carbon conversion as well as enhanced performance, prevents process-induced clogging, displacements and congestion of the gasifier by inert and/or slag-forming contaminants, organises an intensification of the convective heat transfer into the carbon particles by conversion of a quasi-laminar flow into a turbulent flow by flow-shaping devices and a fixation of adaptive gasification zones, ensures stabilisation of the gasification process by separate feeding of e.g. carbonisation gases, gasifying agent, hot steam etc. into the gasification zones above the fluidised fixed bed as well as a differentiated and higher process and temperature stability by a controlling influence by means of flow guides within the gasification zones without accumulation of gas and heat.

Compared to the prior art, the use of this gasifier allows the almost complete conversion of the carbonaceous solids, so that almost completely dedusted raw gases can be obtained.

All features described in the specification, the exemplary embodiments and the following claims can be essential to the invention both individually and in any of their combinations.

LIST OF REFERENCE NUMERALS

1—solids inlet
2—flexible connection
3—gasifier trough
4—casing
5—contaminant outlet
6—discharge chute
7—lock
8—outlet device
9—gasifying agent supply
10—injector
11—separating space
12—flange connection
13—gasifier shell
14—insulation
15—bearing
16—syngas outlet
17—gasifier head
18—servicing access
19—evacuation duct
20—free gasifier space
21—sheathed, truncated cone
22—radial annular gap opening
23—flow control valve body
24—centric guide
25—lifting device
26—baffle
27—adaptive gasification zone (Z1)
28—adaptive gasification zone (Z2)
29—adaptive gasification zone (Z3)
30—flow channel
31—flow ring
32—central annular gap opening
33—filling limit
34—fluidised fixed bed
35—perforated bottom
Z1—first gasification zone
Z2—second gasification zone
Z3—third gasification zone

The invention claimed is:

1. A 3-zone gasifier, comprising a casing surrounding a gasifier trough, a gasifier shell arranged above the gasifier trough and provided with an insulation, a gasifier head arranged above the gasifier shell and provided with an insulation, and a free gasifier space enclosed by the gasifier shell and the gasifier head, wherein:

the gasifier trough, the gasifier shell and the gasifier head (17) are connected to each other in a gas-tight manner, at least one syngas outlet is disposed in an upper part of the gasifier shell, the gasifier trough comprises a perforated bottom and is surrounded by a separating space which terminates in at least one discharge chute, at least one solids inlet terminates in the gasifier trough, the discharge chute comprises a lock and terminates in an outlet device for residues below the perforated bottom, at least one gasification agent supply leads into the discharge chute, at least one injector leads into the gasifier trough above the filling limit, and a sheathed, truncated cone, which is open at its top and bottom surfaces, tapers in diameter towards the gasifier head and is placed, in a bell-like manner, above the gasifier trough, is arranged in the area of the connection between the gasifier trough and the free gasifier space, said truncated cone and a baffle located inside the gasifier shell together generating a radial, annular gap opening and a flow channel, further wherein an upper opening of the truncated cone, which faces the gasifier head, is provided as a flow control valve in such a manner that a flow control valve body with a centric guide is arranged above a valve seat in the form of a flow ring, thereby generating a central, annular gap opening, said truncated cone or said flow control valve body being movable vertically and lockable, so that the annular gap opening dimensionally adjusted by the vertical position of the truncated cone or of the flow control valve body, and the perforated bottom is provided with a contaminant discharge.

2. The 3-zone gasifier as claimed in claim 1, wherein the centric guide passes through the gasifier head in a gas-tight manner and is connected, in a lockable and controllable manner, with a lifting device arranged outside the gasifier head.

3. The 3-zone gasifier as claimed in claim 1, wherein the perforated bottom has a channel-like design and a free aperture surface of approx. 8 to 12% with respect to the area bordering the discharge chute.

4. The 3-zone gasifier as claimed in claim 1, wherein, the gasifier head comprises a servicing access and an evacuation duct which lead through the gasifier shell and the insulation.

5. The 3-zone gasifier as claimed in claim 1, wherein the solids inlet comprises a flexible connection and a conveyor screw and terminates horizontally in the gasifier trough.

6. The 3-zone gasifier as claimed in claim 5, wherein the solids inlet terminates in the gasifier trough nearly two thirds below the filling limit of the solid.

7. The 3-zone gasifier as claimed in claim 1, wherein the gasifier shell holds the gasifier trough with the separating space and the discharge chute via a flange connection via the casing and is supported by a bearing.

8. The 3-zone gasifier as claimed in claim 1, wherein the truncated cone is perforated, pierced, slotted and/or sieve-shaped and the flow control valve body has a ball, cone or half-shell, planar or cylindrical shape and the baffle is angular, round, oval, folded or profiled.

9. A method for operating a 3-zone gasifier, the method being performed in a system comprising:
a casing surrounding a gasifier trough, a gasifier shell arranged above the gasifier trough and provided with an insulation, a gasifier head arranged above the gasifier shell and provided with an insulation, and a free gasifier space enclosed by the gasifier shell and the gasifier head, wherein:
the gasifier trough the gasifier shell and the gasifier head (17) are connected to each other in a gas-tight manner,
at least one syngas outlet is disposed in an upper part of the gasifier shell,
the gasifier trough comprises a perforated bottom and is surrounded by a separating space which terminates in at least one discharge chute,
at least one solids inlet terminates in the gasifier trough,
the discharge chute comprises a lock and terminates in an outlet device for residues below the perforated bottom,
at least one gasification agent supply leads into the discharge chute,
at least one injector leads into the gasifier trough above the filling limit, and
a sheathed, truncated cone, which is open at its top and bottom surfaces, tapers in diameter towards the gasifier head and is placed, in a bell-like manner above the gasifier trough, is arranged in the area of the connection between the gasifier trough and the free gasifier space said truncated cone and a baffle located inside the gasifier shell together generating a radial, annular gap opening, and a flow channel,
further wherein an upper opening of the truncated cone, which faces the gasifier head, is provided as a flow control valve in such a manner that a flow control valve body with a centric guide is arranged above a valve seat in the form of a flow ring, thereby generating a central, annular gap opening, said truncated cone or said flow control valve body being movable vertically and lockable so that the annular gap opening is dimensionally adjusted by the vertical position of the truncated cone or of the flow control valve body, and the perforated bottom is provided with a contaminant discharge;
the method comprising:
causing a uniform flow to pass upwards through the 3-zone gasifier from the bottom to the top, with a continuous conversion of carbonaceous solids taking place via selective partial oxidation and reduction via of adaptive gasification zones Z1 and Z2 as well as via the adaptive gasification zone Z3 with post-reduction and post-oxidation under defined atmospheric conditions, the dimension of the central annular gap opening (32) being controlled, thereby generating turbulent flows.

10. A method for operating a 3-zone gasifier as claimed in claim 9, further wherein:
the gasifier trough is charged with carbonaceous solids or with a solids/gas mixture via the solids inlet and is loaded, via the channel-shaped perforated bottom arranged in the lower part of the gasifier trough, with a pre-heated gasification agent admitted in a controlled manner, rising up from the bottom to the top, resulting in fluidised floating of the fixed bed in the adaptive gasification zone Z1 in the operating condition required in terms of temperature, at approximately 800° C., accompanied by a reactive thermochemical conversion of the carbonaceous solids to a syngas with a high calorific value,
the solid matter released, but not yet converted, during said floating is subject to another thermochemical conversion at approximately 1300° C. in the subsequent adaptive gasification zone Z2, above the filling limit,
this process is enhanced by separate admission of carbonisation gases, the gasification agent, and hot steam via the injector into the gasification zone Z2 and by guiding the gas over the radial, controlled annular gap opening,
the resulting speed distribution over the adaptive gasification zones Z1 and Z2 and at the turbulent passage from the central annular gap opening the free gasifier space of the adaptive gasification zone Z3 at approximately 950° C. has a prolonging effect on the dwell time of the still present, floating residual carbon and its nearly complete conversion to syngas,
so that the organic compounds are converted to a syngas of high calorific value and the inert contaminants of higher density than the fluidised carbon mixture descend, thereby being discharged via the channel-shaped perforated bottom, the discharge chute, the lock and the outlet device, removing any unseparable residues above the channel-shaped perforated bottom via the contaminant discharge and controlling the required filling level of the admitted carbonaceous solids in the gasifier trough and, thus, the filling limit and extracting the resulting syngas in the upper part of the gasifier.

* * * * *